United States Patent [19]

Harrison

[11] 3,915,892

[45] Oct. 28, 1975

[54] VANADIUM-PHOSPHORUS MIXED OXIDE OXIDATION CATALYSTS

[75] Inventor: Jonas P. Harrison, Pinole, Calif.

[73] Assignee: Chevron Research Company, San Francisco, Calif.

[22] Filed: Apr. 12, 1973

[21] Appl. No.: 350,564

Related U.S. Application Data

[62] Division of Ser. No. 200,724, Nov. 22, 1971.

[52] U.S. Cl. .............. 252/435; 252/437; 260/346.8
[51] Int. Cl.² ........................................ B01J 27/14
[58] Field of Search .......................... 252/435, 437

[56] References Cited
UNITED STATES PATENTS

| | | | |
|---|---|---|---|
| 3,156,705 | 11/1964 | Kerr | 252/435 X |
| 3,156,706 | 11/1964 | Kerr | 252/435 X |
| 3,156,707 | 11/1964 | Kerr | 252/435 X |
| 3,238,254 | 3/1966 | Kerr | 252/437 X |
| 3,255,211 | 6/1966 | Kerr | 252/435 X |
| 3,255,212 | 6/1966 | Kerr | 252/435 X |
| 3,255,213 | 6/1966 | Kerr | 252/435 X |
| 3,288,721 | 11/1966 | Kerr | 252/435 |
| 3,293,268 | 12/1966 | Bergman et al. | 260/346.8 |
| 3,625,863 | 12/1971 | Heller et al. | 252/435 X |

*Primary Examiner*—Helen M. S. Sneed
*Attorney, Agent, or Firm*—G. F. Magdeburger; John Stoner, Jr.; T. G. De Jonghe

[57] ABSTRACT

A method is described for the preparation and use of an improved vanadium-phosphorus mixed oxide oxidation catalyst and of a novel mixed oxide monohydrate which is a precursor of the catalyst.

15 Claims, 1 Drawing Figure

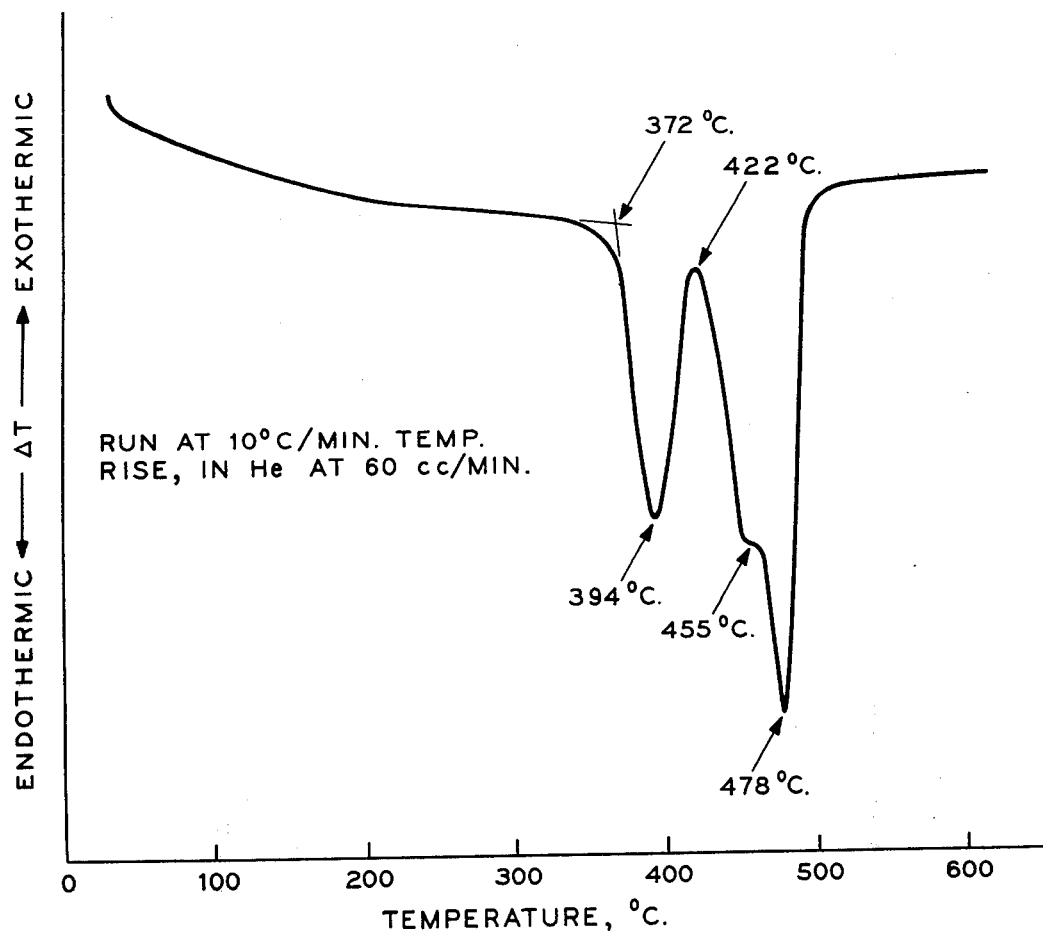

VANADIUM-PHOSPHORUS MIXED OXIDE OXIDATION CATALYSTS

This is a division of application Ser. No. 200,724 filed Nov. 22, 1971.

BACKGROUND OF THE INVENTION

1. Field of the Invention

This invention relates to improved vanadium-phosphorus mixed oxide oxidation catalysts. More particularly, it relates to a unique method for the preparation of a vanadium-phosphorus mixed oxide complex of improved activity and selectivity for use in the production of maleic anhydride from a hydrocarbon feed.

2. Prior Art

The preparation of a mixed oxide comprising vanadium and phosphorus for use as a catalyst for a vapor phase oxidation of a hydrocarbon feed is known in the art. In general, these oxidations suffer from a number of disadvantages including relatively low yields of the desired product. For example, in the process of U.S. Pat. No. 3,293,268, a mixed oxide catalyst of a vanadium-phosphorus composite is used to oxidize an n-butane feed to maleic anhydride. The oxidation temperatures employed are in the range 525° to 600°C. and the yields are in the range 25 to 52 weight percent based upon the feed. The theoretical yield for the reaction:

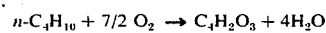

$$n\text{-}C_4H_{10} + 7/2\, O_2 \rightarrow C_4H_2O_3 + 4H_2O$$

is 169 percent. The actual yield reported in the above patent reference is less than 33⅓ percent of theory. There is a need for substantial improvement in the process.

A common cause for poor yields in a vapor phase oxidation of a hydrocarbon feed is often a matter of a concurrent oxidation of the desired product, that is, overoxidation. The 525° to 600°C. temperatures used in the representative patent example above are relatively high in terms of the temperature requirements for stability of an organic compound, especially an oxygen-containing compound, under oxidative conditions. This suggests that a possible approach in a search for yield betterment would be to develop or find a more active catalyst, one which can be used for oxidation at a lower temperature. But the question, of course, is how or where?

SUMMARY OF THE INVENTION

An anhydrous vanadium-phosphorus mixed oxide complex having improved catalytic activity and selectivity for the air or oxygen partial oxidation of n-butane to maleic anhydride is prepared from the corresponding mixed oxide dihydrate under a controlled pretreatment. The treatment includes effecting the dihydrate-monohydrate crystal phase change of the mixed oxide precursor, a bulk phase change, under substantially isothermal and nonequilibrium dehydration conditions. Preferably a subsequent treatment is used which includes effecting two additional and successive bulk phase changes in the mixed oxide:

1. the monohydrate-anhydrous oxide phase change, and
2. a post dehydration phase change, under substantially isothermal conditions. During the two hydrate phase changes the average valence of the vanadium component of the complex oxide is maintained in the range from about plus 3.9 to plus 4.5, preferably 4.0 to 4.5. The temperatures required for the bulk phase changes are the phase transition temperature ranges for the respective phase changes:

| PHASE CHANGE | TRANSITION TEMPERATURE RANGE, °C. |
|---|---|
| dihydrate-monohydrate | ca. 370–394 |
| monohydrate-anhydrous oxide | ca. 395–425 |
| post dehydration | ca. 450–500 |

In the method of the invention a mixed oxide of vanadium and pentavalent phosphorus in substantially the dihydrate form is converted to the monohydrate. The average valence of the vanadium component of the mixed oxide is in the range 3.9 to 4.5 and the phosphorus to vanadium atomic ratio for the mixture is in the range from 1–2 to 1, preferably 1–1.5 to 1. The conversion to the corresponding monohydrate is effected by maintaining the dihydrate in particulate form at a temperature in the range from about 370°–394°C. for a period (usually in the range from about 0.5 to 2 hours) sufficient for the removal of about one mol of water per mol (formula weight) of the oxide, usually about a 5 weight percent loss by the heated oxide dihydrate charge. During the evolution of this first molecule of water of hydration, nonequilibrium conditions are maintained by removing the water vapor substantially as it is evolved by passing a stream of oxygen-containing carrier gas over or through the heated dihydrate. Air is the preferred and the most convenient carrier gas for reasons of cost. It serves to partially oxidize the vanadium component at the temperature and during the period required for the completion of the bulk phase change for the dihydrate-monohydrate crystal phase transition. The resulting monohydrate is an especially useful precursor for the production of an improved complex vanadium-phosphorus mixed oxide oxidation catalyst.

Surprisingly, the manner in which the aforementioned dihydrate-monohydrate phase change is carried out is determinative of the relative performance (activity and selectivity) of the ultimate anhydrous mixed oxide oxidation catalyst. As discussed and exemplified below, depending upon the treatment at this stage, the activity of the final anhydrous complex oxide may be essentially nil, excellent or mediocre.

In the preferred method of the invention, the monohydrated oxide produced in the above-described manner is subjected to two additional controlled pretreatment stages. In the first of these, the monohydrate-anhydrous oxide transition, the monohydrate is converted to the anhydrous form, and in the second the resulting anhydrous oxide undergoes a bulk crystal phase transition.

During the foregoing three bulk phase transitions, the average valence of the vanadium component must be maintained in the range 4.1 to 4.5, and a partial pressure of oxygen must be also maintained in contact with the mixed oxide. Whenever the average valence of the vanadium is permitted to exceed about 4.5, the resulting catalyst is in general a poor catalyst. Similarly, unless the atmosphere surrounding the oxide has a partial pressure of oxygen during all or most of the phase transition periods, the resulting catalyst is in general a poor catalyst. It appears that molecular oxygen interacts with or exerts a functional effect upon the transforming solid bulk phase.

The molecular oxygen requirement is conveniently satisfied by passing a current of air through or over the oxide. The vanadium component is susceptible to oxidation and this is desirable to a degree. It must not be overoxidized. Moreover, even when the average valence of the vanadium is within the 4.1 to 4.5 range, the presence of molecular oxygen is still necessary during the controlled treatment. Stabilization of the vanadium oxidation state is then achieved by adding a reducing component, for example a vaporized hydrocarbon, to the oxygen-containing gas stream. Thus, if the initial average valence of the vanadium in the dihydrate is about plus 4, some partial oxidation of the vanadium is desirable. The optimum value for the fully activated catalyst is about 4.2. Thereafter, the gas stream should be changed to contain a reducing component as well as molecular oxygen. On the other hand, where the initial average valence of the dihydrate is well within the permissible range, then the gas stream must contain a reducing component during the controlled phase transition treatments.

The average valence of the vanadium is determined by routine chemical methods such as titrations using standard aqueous ceric and ferrous reagent solutions. Although these wet analysis methods only yield an average valence value, i.e., do not distinguish relative amounts of plus 3, plus 4 and plus 5 vanadium valence states, the determination is adequate for the purposes herein.

In effecting the monohydrate-to-anhydrous oxide phase transition, the monohydrate in particulate form is maintained at a temperature in the transition temperature range, i.e., about 395°C. to 450°C. until about one mol of water of hydration per mol (formula weight) of the charge is evolved (about a 5 percent loss in weight). Usually a period in the range from about 0.5 to 2 hours is satisfactory. Depending upon the average valence of the vanadium component, a stream of air or air containing a reducing component, for example a vaporized hydrocarbon, is passed over or through the oxide during this stage. When the vanadium component has an initial average valence of about 4.0, the use of air throughout the period required for the dihydrate-monohydrate transition is satisfactory. All subsequent gas streams must be air containing a reducing component or the equivalent.

The dehydration phase changes may be summarized by representative equations as follows:

FIRST HYDRATE TRANSITION (1) $(V_2O_4)(P_2O_5)_{1.2} \cdot 2H_2O_{(x)} + O_{2(y)} \rightarrow V_2O_n(P_2O_5)_{1.2} \cdot H_2O_{(x)} + H_2O_{(y)}$ (where $n$ is in the range 4.1–4.5)

SECOND HYDRATE TRANSITION maintained at a temperature in the transition range, i.e., from about 450° to 520°C., preferably 470°–490°C., for a period in the range from about 4 to 16 hours. When this treatment is finished, the average valence of the vanadium component is substantially fixed. That is, while a slow drift in this valence may occur from subsequent use and contact of the mixed oxide with air or oxygen, the relatively rapid oxidation of the vanadium component which was possible and is a matter which necessitates particular control in the abovedescribed three treatment stages is not a complicating factor. During the third transition change, however, an air stream containing a reducing component or the equivalent is passed over or through the particulate anhydrous mixed oxide in order to maintain the vanadium at an average valence within the range 4.1–4.5 and to maintain an atmosphere containing molecular oxygen in contact with the treated mixed oxide. The resulting preconditioned complex vanadium-phosphorus oxide has a superior activity and selectivity relative to known similar mixed oxide hydrocarbon oxidation catalyst composites (see comparative Examples 1 and 2–5 below).

The relative amount of molecular oxygen desirably present in the carrier or gas streams required for the method herein may vary widely. In general, if the effluent stream contains an appreciable amount, for example of the order of 1 volume percent of molecular oxygen, the molecular oxygen requirement is satisfied. For reasons of cost and convenience, air is the practical and preferred molecular oxygen-containing gas. The amount of oxygen relative to diluent gas may be larger than in the case of air, but no particular advantage results. In addition to nitrogen, other inert or substantially inert diluents for the oxygen include the usual gases such as carbon dioxide, helium, and neon.

The relative amount of the reducing component desirably present in the carrier or gas streams required for the method herein may also vary widely. As in the case of the molecular oxygen component, in general, if the effluent stream contains an appreciable amount (i.e., of the order of 1 volume percent), the desired stabilization of the oxidation state of the vanadium component is realized. Usually the presence of an amount of the reducing component in the range from one-half to 10 volume percent is satisfactory. Larger relative amounts may be used, but in general no particular advantage is experienced from such use.

The reducing component requirement herein is satisfied by any hydrocarbon or partially oxidized hydrocarbon which is a gas at a temperature within the treatment range. Preferably the component is a hydrocarbon, and most preferably a hydrocarbon which is a precursor of maleic anhydride, for example benzene, n-butane, n-butene, butadiene, a $C_4$–$C_5$ alkane mixture, and the like.

(2) $(V_2O_n)(P_2O_5)_{1.2} \cdot H_2O_{(x)} \xrightarrow{\text{air-hydrocarbon mixture}} (V_2O_n)(P_2O_5)_{1.2(x)} + H_2O_{(y)}$ The grouping of the vanadium and phosphorus in the foregoing equations is used as a matter of convenience. Actually the solid oxide mixture appears and is believed to be a substantially homogeneous crystalline solid.

For the third transition, the post dehydration bulk crystal phase transition, the anhydrous mixed oxide is By particulate form, as used herein, is meant by definition that the mixed oxide has an average particle diameter in the range from about one-half inch down to 50 microns. That is, a range of sizes which includes particle sizing satisfactory for use in fixed bed and sizing satisfactory for use in a fluid bed operation, as known in the art, is contemplated.

THE FIGURE

Referring now to the Figure, the curve represents the results obtained from a differential thermal analysis (DTA) of a complex vanadium(IV)-phosphorus(V) oxide dihydrate. The DTA analytical technique is described in the art (see the text: "Differential Thermal Analysis" by R. C. Mackenzie, Academia Press, London and New York, 1970, Chapter 11, Pages 343–361). These data demonstrate the bulk phase transition temperatures discovered in the course of the research which ultimately led to the present invention. Briefly, the DTA method involves passing a steady flow of an inert gas, such as helium, through or above a bed of the solid material to be tested. The temperature difference between the solid and an inert reference is measured and compared. The temperature of the solid and reference is increased at a uniform moderate rate, for example 10°C. per minute. Solid crystal phase transitions are, in general, accompanied by an energy effect which is characteristic for the given change. For example, at about 372°C. (break in the curve of the Figure) and in the range 372°–394°C., a phase transition (dihydrate to monohydrate) is demonstrated. Thereafter the oxide increases in temperature until at about 415°–425°C. another phase transition (monohydrate to anhydride) starts to take place and appears to be completed at about 450°C. (short plateau in the curve) with a third transition (a crystal phase change in the anhydrous oxide) commencing at about 455°C. and being completed at a temperature of about 480°C.

EMBODIMENT

In a preferred embodiment a vanadium(IV)-phosphorus(V) oxide dihydrate is prepared by dissolving vanadium pentoxide in concentrated aqueous hydrogen chloride and then adding 85 percent phosphoric acid to the resulting solution (see, for example, U.S. Pat. No. 3,293,268). The $V_2O_5$ and $H_3PO_4$ additions are made in amounts sufficient to yield a phosphorus to vanadium atomic ratio of about 1.2. The resulting solution is then concentrated by heating until a thick aqueous slurry containing about 50 percent (weight) of solids is obtained. During this operation much of the hydrogen chloride and water in the mixture is evolved. Also, the vanadium component is reduced from the plus 5 to an average value of about plus 4. The thick slurry is then conveniently dried to constant weight in air by maintaining it at a temperature of about 150°C. During this drying the loosely associated water is evolved leaving a mixed oxide residue which is substantially the dihydrate and in which the average valence of the vanadium component is about 4.02. It is a homogeneous complex mixed oxide.

For the processing of the dihydrate in the abovedescribed three phase transitions, the dihydrate must be in particulate form (see definition above). Depending upon the desired catalyst configuration, the dihydrate is then either sized and screened or pulverized and mixed with sufficient water to form an extrudable paste. In the latter case the paste is then extruded (for example using 3/16 inch diameter die), sized to a desired length (about ½ inch) and dried in air at a temperature of about 150°C.

The dihydrate is then converted to the monohydrate by maintaining it at a temperature of about 385°C. in a stream of air (oxygen-containing carrier gas). Based upon the dihydrate charge, when the weight loss is about 5 percent, the dihydrate-monohydrate phase transition is completed.

Next the monohydrate is converted to the anhydrous oxide by raising its temperature to about 410°C. and passing a carrier gas mixture of n-butane-air (1.5 volume percent n-butane) through the oxide. A contact time for the carrier gas of about 5 seconds is satisfactory. After a weight loss by the charge of 5 percent, this stage is completed.

Finally, the crystal structure of the anhydrous oxide is fixed by raising the temperature to about 480°C. and maintaining it there for about 5 hours. The resulting complex composite, after a relatively short run-in period (16 to 30 hours) under vapor phase hydrocarbon oxidizing conditions, exhibits an excellent activity, selectivity and catalyst life.

STANDARD CATALYST TEST

In order to compare oxidation catalysts in a meaningful manner herein, a test was required and developed. Two primary factors are involved: (a) activity, and (b) selectivity. The temperature at which the use of a given catalyst results in a 90 percent conversion of hydrocarbon feed at a 1 second contact time was found to be a good measure of the activity of the catalyst, and one which can be conveniently determined. The yield of the desired product (maleic anhydride) based upon the feed converted (90% in the standard test) is the measure of the selectivity of the catalyst.

MIXED OXIDE DIHYDRATE PRECURSOR

The dihydrate used in the method of the invention may be prepared by known methods in which a vanadium compound and a pentavalent phosphorus compound are reacted in a liquid medium. Sufficient water to form the dihydrate must be present in the medium or be produced from the reaction. Preferably, the vanadium compound and phosphorus compound are dissolved in an aqueous medium. The water which is present in excess of the requirement for the dihydrate is removed by maintaining the reaction mixture at a temperature below the dihydrate-monohydrate transition temperature range. Preferably, the drying is carried out at or below 150°C. Under these conditions it can be effected in air without any substantial oxidation of the vanadium component by the oxygen in the air.

For the dihydrate preparation the phosphorus(V) component may be added as phosphorus pentoxide, phosphoric acid, phosphorus oxytrichloride, phosphoric acid esters, or a mixture of these reagents. The vanadium component may be any one of a number of compounds including vanadium pentoxide, vanadium tetroxide, vanadium oxalate, ammonium vanadate, vanadium oxydichloride, vanadium oxydibromide, vanadium oxytrichloride, or mixtures and the like. Where dissolution of the reagents is slow, concentrated aqueous hydrochloric acid or hydrogen chloride gas may be added. In general, the reagents and water are mixed and heated until the solids are dissolved. At this point the solution is usually redbrown in color. As this solution is concentrated by evaporation of water and volatile acids, such as hydrochloric, hydrobromic, and the like acids, the vanadium if present in the plus 5 valence state is reduced in the main to the plus 4 state and the solution takes on the well-known blue coloration of vanadium(IV).

If for some reason the necessary reduction does not occur, organic or inorganic reducing agents such as formaldehyde, acetaldehyde or hydrogen and the like (cf., U.S. Pat. No. 3,288,721) may be added as in a titration in amounts sufficient to produce the desired and characteristic blue solution. On the other hand, if by inadvertence, etc., over-reduction occurs (solution goes from red-brown to blue to black), then an oxidizing agent, such as hydrogen peroxide, may be added, again as in a titration, or the oxidation can be carried out by maintaining the pH of the solution below about 3 and passing air or oxygen into the solution until the blue or red-brown color develops. Where organic reagents or cosolvents are used in the preparation, the dihydrate may also contain an adsorbed or coordinate complex bonded organic component. The presence of the organic material does not, in general, alter the bulk phase transition treatment effects. However, its presence does necessitate some care in bringing the pretreated mixed oxide on-stream in its use as an oxidation catalyst. Organic residue on or in the mixed oxide are removed by an initial controlled burn-off at an oxidation temperature. The control is conveniently effected by monitoring the mixed oxide (catalyst bed) temperature and increasing or decreasing the gas feed flow as required to keep the temperature at a moderate value.

The relative amounts of the vanadium and phosphorus compounds satisfactory for use in the preparation of the mixed oxide dihydrate (catalyst precursor) is determined by the P/V atomic ratio desired. Excellent catalysts are obtained when this ratio is about 1.2. In general, useful catalysts are obtained by the method of the invention when this ratio is in the range 1 to 2, preferably 1.1 to 1.5.

In general, the presence in the mixed oxide dihydrate precursor of a minor amount of an oxide of elements of the Periodic Chart of Elements (Fisher Scientific Co.) of Groups 4–8 does not appear to interfere with the dihydrate-monohydrate phase transition. Thus, where the presence of one or more oxides of this group is desired as a catalyst promoter in a vanadium-phosphorus oxide composite, the use of the method of the invention in treating these compositions is beneficial. Usually the amount of such promoter oxides (as the cation) relative to the sum of the mols of vanadium and phosphorus atoms is less than 1 mol percent, i.e., a minor amount.

MIXED OXIDE MONOHYDRATE PRECURSOR

The vanadium-phosphorus mixed oxide monohydrate prepared by the method of the invention is a useful precursor for the preparation of hydrocarbon vapor phase oxidation catalysts having a range of oxidation activities. The monohydrate is converted to the anhydrous oxide by maintaining the monohydrate at a temperature in the range from about 395° to 600°C. For the preparation of an anhydrous oxide of the high activity and selectivity required for the oxidation of a saturated aliphatic $C_4$–$C_6$ hydrocarbon feed (the most difficult to oxidize) to maleic anhydride, the particular controlled treatments for the bulk phase transitions: (1) the monohydrate to anhydrous oxide; and (2) the anhydrous oxide crystal phase transition, described above, are required.

On the other hand, an improved catalyst having a reltively lower oxidation activity is produced where the controlled second and third bulk phase transition treatments are not used and the monohydrated oxide precursor is converted to the anhydrous mixed oxide by heating it directly to a temperature in the range from about 500° to 600°C. for the removal of the water of hydration and stabilization of the vanadium oxide component.

BULK PHASE TRANSITION TEMPERATURE RANGES AND TIMES

The above-described phase transition temperature ranges may vary moderately depending upon the relative amounts of the vanadium and phosphorus oxides in the complex dihydrate mixture and upon the average valence of the vanadium in the dihydrate precursor. In general, however, the shape of the respective DTA curves, the number of principal transitions and the like for the oxide dihydrates is characteristic and is substantially as illustrated in the Figure.

The activity and selectivity of vanadium-phosphorus oxidation catalysts appear to relate in the main to structural and physico-chemical changes which occur during the bulk changes of the three phase transitions described above. The transitions occurring during these phase changes appear to be irreversible. The sites responsible for the catalytic activity and selectivity are believed to be produced in the main during the removal of water from adjacent hydroxyl groups. The evolution of water of hydration appears to be accompanied by the production of strain in the crystal lattice. This strain is probably alleviated subsequently by the uptake of oxygen atoms from the oxidizing atmosphere during the first stage of the pretreatment. If the temperature at this stage is too low, no satisfactory dehydration, of course, occurs. If the temperature is too high (i.e., above the pertinent phase transition temperature range), the water is removed too quickly, a different crystal phase condition develops, and the resulting mixed oxide is inactive or a poor oxidation catalyst.

The DTA curves and the water evolution results obtained in this work support and suggest the concept that the intermediate composition herein is the monohydrate of the mixed oxide and contains one mol of water of hydration per mol of phosphorus in the mixed oxide. It must be recognized, however, that the composition may actually be an equimolar mixture of the dihydrate starting material and the anhydrous mixed oxide.

GAS FLOW RATES

A wide range of flow rates may be used in connection with the passing of a carrier or conditioning gas through or over the mixed oxide during the respective bulk phase transitions. There must be some flow. Apparently the requirement is related to one or more factors including:

1. need to avoid a local depletion of molecular oxygen, or molecular oxygen and a reducing component, and
2. a need for the removal of liberated water during the transition period.

In general, a flow (space velocity) of carrier or conditioning gas in the range from about 0.001 to 10, preferably 0.1 to 5, volumes per volume of the mixed oxide per minute is satisfactory.

MIXED OXIDE CATALYST CONFIGURATIONS

The size and shape of the pretreated mixed oxide preparations herein are desirably in accordance with ordinary usage depending upon whether a fixed bed or fluid bed vapor phase reactor is used. Where a supported catalyst, i.e., a composite which includes an inert carrier such as silica, alpha alumina, titania, magnesium oxide, zinc oxide, carborundum, and the like, the preparation may be as follows:

1. by pulverizing the mixed oxide dihydrate precursor and slurrying the finely-divided solid and the carrier in water; and
2. by drying the resulting composite to constant weight at a temperature below the dihydrate-monohydrate transition temperature, preferably at about 150°C., and carrying out the pretreatments as described above; or
3. pretreating a mixed oxide dihydrate in the manner described above and then pulverizing and disposing the powdered solid in admixture with water upon a suitable carrier. Since the oxide characteristics are established by the treatment, the resulting composite may be dried at any convenient temperature and used.

HYDROCARBON OXIDATION CONDITIONS

A particular advantage of the pretreated mixed oxides of the invention in the production of maleic anhydride is the ability of these oxides to effectively catalyse the vapor phase oxidation of a saturated hydrocarbon feed at a temperature below 500°C., especially below 490°C. and above about 400°C. The conditions desirably employed are otherwise those known and used in the vapor phase oxidation art. For example, the catalyst may be used in a fixed-bed or fluid-bed form; air is the oxygen-containing gas of choice; and air-hydrocarbon mixtures having a composition as desired should be employed. Useful system pressures are in the range from about 0.5 to 10 atmospheres, especially 1 to 3 atmospheres. Where n-butane is the process feed, best yields of maleic anhydride are produced at pressures in the range 1–5 atmospheres with the n-butane mixed with air in the proportion of from about 1–2 and higher volume percent of the air stream, and passed over the catalyst utilizing a contact time in the range 0.3 to 1.5 seconds.

For reasons of cost air is the preferred oxidizing gas. However, the n-butane may be admixed with oxygen gas together with sufficient inert diluent gases such as nitrogen, carbon dioxide, carbon monoxide, and water vapor.

The heat produced in the exothermic oxidation reaction is removed in the conventional manner, that is, by the use of indirect heat exchangers, salt baths and the like.

The following examples further illustrate the invention. The selectivities in the examples are percent yields based on the number of pounds of maleic anhydride produced per pound of n-butane converted.

EXAMPLES 1–12

In the Examples of the Table, a representative vanadium-phosphorus mixed oxide dihydrate was prepared by mixing vanadium pentoxide with concentrated aqueous hydrochloric acid and heating the mixture until solution of the vanadium oxide was complete. Phosphoric acid (85 weight percent) was then added to the blue vanadium oxydichloride solution obtained from the acid treatment in a relative amount sufficient to yield an atomic ratio of vanadium to phosphorus of about 1.2. The aqueous vanadium oxydichloride-phosphoric acid solution was then concentrated by evaporating water at a temperature of about 150°C. until a slurry was produced. The wet slurry was then dried to constant weight by heating at a temperature of 150°C. in a ventilated oven. The dried mixed oxide, the dihydrate, was then broken up by mechanical means and sized to the 20–28 mesh (U.S. Standard) range. It had a surface area (B.E.T. Method) of about 3 m²/g.

In the procedures described below, aliquots (10–20 cc) of the dried mixed oxide dihydrate were placed in a ½ inch diameter (No. 316SS or aluminum) reaction tube and given the indicated pretreatment. The resulting catalysts were then evaluated under the standard test conditions (90% conversion, 1 second contact time, etc.) in a vapor phase oxidation reactor. The maleic anhydride content of the effluent gas stream from the reactor was condensed and determined by a routine caustic titration using phenolphthalein indicator (results confirmed by polarographic and potentiometric titration methods). The n-butane-air feed stream was analyzed using gas-chromatographic methods supplemented by occasional fixed gas analysis in a Fisher gas partitioner unit. The results of the tests and analyses are listed in the Table:

TABLE

| | | CATALYST PERFORMANCE | | | |
|---|---|---|---|---|---|
| EXAMPLE NO. | PRETREATMENT METHOD | Std.[1] Activity, °C. | Selectivity[2] | Space Rate, V/V/Hr. | Run Time, Hr. |
| 1 | A | 525 | <70 | 700 | 100–300 |
| 2 | B | 470 | 90 | 780 | 287 |
| 3 | C | 465 | 97 | 813 | 113 |
| 4 | D | 460 | 89 | 750 | 120 |
| 5 | E | 450 | 91 | 750 | 160 |
| 6 | F | >550 | — | 750 | 160 |
| 7 | G | >550 | — | 750 | 160 |
| 8 | H | 478 | 86 | 700 | 530 |
| 9 | I | 485[3] | 84 | 672 | 285 |
| 10 | J | 492 | 78 | 810 | 162 |
| 11 | K | 535 | — | 750 | 49 |
| 12 | L | 520 | — | 750 | 49 |

[1] 90% conversion, 1 sec. contact time and 1.5 volume percent n-butane in air.
[2] Weight percent yield based upon n-butane converted.
[3] Activity increasing with time on stream.

PRETREATMENT METHOD

A. Conventional Pretreatment:
  Mixed oxide temperature increased from 250° to 500°C. at a rate of 200°C. rise per hour; an air-butane mixture containing 1.5 volume percent of n-butane contacted with the oxide at 700 V/V/Hr.

B. 2-Stage Transition Phase Pretreatment:

1. Mixed oxide dihydrate precursor heated from 250°C. to 385°C. in an atmosphere of air at 1 atmosphere pressure flowing at the rate of 120 V/V/Hr., thereafter maintaining the temperature at 385°C. for about 1 hour at 120 V/V/Hr.;
2. Heating the oxide monohydrate of Item (1) to 414°C. and maintaining the temperature at 414°C. while passing an air-n-butane mixture (1.5 volume percent n-butane) through the oxide at 120 V/V/Hr.; and
3. Increase the n-butane air mixture flow rate to 700 V/V/Hr. while heating the oxide up to about 470°C. at a rate of temperature rise of about 5°–10°C. per hour.

C. As in (B) except in Step (1) the air pressure was 25 psig.

D. As in (B) except the heating started with the mixed oxide at the ambient temperature initially and using 200 V/V/Hr. of air.

E. Stepwise heating at 300 V/V/Hr. in:
1. Air at 360°C.;
2. 1.5% n-butane in air to 385°C. and hold for 1 hour;
3. To 415°C. and hold for 1 hour;
4. To 460°C. and hold for 1 hour; all temperature increases at the rate of 5°–10°C. per minute; and
5. Use of catalyst at 500°C. (1.5% butane-air), reducing temperature until activity lined out at standard test conditions, i.e., 90% conversion, 1 second contact time, etc.

F. As in (E), step (1), except the temperature was raised to 420°C., followed by step (5) of (E).

G. As in (F), but there was no flow of air in step (1) after which step (5) of (E) was carried out.

H. The dried mixed oxide dihydrate was heated from 260°C. at 1.8°C. per minute temperature rise to 480°C. while passing air n-butane (1.5% n-butane) at 90 V/V/Hr. The catalyst was then maintained at 480°C. for 65 hours while passing the n-butane-air through the catalyst at 90 V/V/Hr., after which the feed rate was increased to 700 V/V/Hr.

I. The mixed oxide was prepared as described above, and dried at about 150°C. The dried solid was then ball-milled and mixed with water to make a paste which was then extruded as ⅛ inch diameter rods and cut to convenient lengths. After drying again at about 150°C., the catalyst pellets were activated as in method (B) above.

J. As in (B), except step (1) with air-n-butane flow at 1500 V/V/Hr. at 25 psig., followed by steps (2) and (3).

K. The dried mixed oxide dihydrate was heated up in hydrogen gas at 300 V/V/Hr. to 360°C., held at 360°C. for 2 hours and then brought to the reaction temperature while passing 1.5% n-butane-air mixture at 700 V/V/Hr. over the catalyst.

L. The dried mixed oxide dihydrate was heated in n-butane to 360°C. at 300 V/V/Hr.; maintained at 360°C. for 2 hours, and then heated to reaction temperature at 700 V/V/Hr. in 1.5% n-butane-air.

As will be evident to those skilled in the art, numerous modifications in this method can be made or followed, having in mind the foregoing disclosure and discussion without departing from the spirit or scope of the disclosure or from the scope of the following claims.

I claim:

1. The method for the preparation of an improved oxidation catalyst from a particulate complex mixed oxide dihydrate of vanadium and pentavalent phosphorus, said oxide having a phosphorus to vanadium atomic ratio in the range from about 1–2 to 1, and said vanadium having an average valence in the range from about 3.9 to 4.5, which comprises:
   1. introducing said oxide into a treating zone;
   2. maintaining said oxide and zone at a temperature in the dihydrate-monohydrate transition temperature range of the oxide of about 370° to 394°C for a period sufficient for the liberation of about one mol of water of hydration per mol of the oxide;
   3. maintaining the average valence of the vanadium in the vanadium component of said oxide in the range from about 4.1–4.5 and withdrawing said liberated water from said zone during liberation by passing a carrier gas through said zone, said carrier gas being selected from the group consisting of air, oxygen, an inert gas containing oxygen, and of said oxygen-containing gases plus a hydrocarbon component, said gases containing sufficient of molecular oxygen or of molecular oxygen and hydrocarbon to provide an effluent stream containing at least about one volume percent of oxygen or of one volume percent each of oxygen and hydrocarbon; and
   4. removing the balance of the water of hydration from the resulting monohydrate by maintaining said zone and resulting monohydrate at a temperature in the range from about 395°C. to 600°C. and by passing a carrier gas through said zone as in (3).

2. The method as in claim 1 wherein the removal of said water balance is carried out by maintaining said temperature in the monohydrate-anhydrous oxide transition temperature range.

3. The method as in claim 2 wherein said resulting anhydrous oxide is maintained at a temperature in the bulk phase crystal transition range for a period in the range from about 4 to 26 hours.

4. The method as in claim 2 wherein said transition temperature range is from about 395°C. to 425°C.

5. The method as in claim 3 wherein said transition temperature range is from about 450°C. to 500°C.

6. The method for the preparation of a homogeneous mixed oxide of vanadium and phosphorus by reacting a pentavalent phosphorus oxide compound with C.; vanadium oxide compound in an aqueous medium, which comprises admixing said reactants with concentrated aqueous hydrochloric acid, the atomic ratio of phosphorus to vanadium in the mixture being in the range from about 1–2 to 1; adjusting the average valence of the vanadium component to a value in the range from about 3.9 to 4.5; concentrating the resulting solution by heating until a thick aqueous slurry is produced; drying said slurry to a solid of constant weight by maintaining it at a temperature at or below about 150°C; pulverizing the dried solid; and subjecting the dried solid to a series of three treatments by:
   1. maintaining said oxide in the first treatment at a temperature in the range from about 370° to 394°C. for a period sufficient for a weight loss based upon the oxide dihydrate of about 5 weight percent, said period being in the range from about 0.5 to 2 hours;
   2. passing a molecular oxygen-containing gas over or through said oxide during said first treatment, said gas being selected from the group consisting of air and molecular oxygen in admixture with an inert gas;

3. raising the temperature of the oxide resulting from the first treatment to a temperature in the range from about 395°C. to 425°C. and maintaining said temperature in the second treatment for a period sufficient for an additional weight loss of about 5 percent by said oxide;

4. raising the temperature of the oxide resulting from the second treatment to a temperature in the range from about 450°C. to 500°C. and maintaining said temperature for a period in the range from about 4 to 26 hours; and 5. maintaining the average valence of the vanadium component of said oxide at a value in the range from about 4.1 to 4.5 during said second and third treatments by passing a gas containing a hydrocarbon component through or over said oxide, said gas being selected from the group consisting of air and molecular oxygen in admixture with an inert gas.

7. The method as in claim 6 wherein said atomic ratio is about 1.2.

8. The method as in claim 6 wherein said first treatment is at a temperature of about 385°C., and said second treatment is at a temperature of about 410°C.

9. The improved anhydrous mixed oxide composition prepared in accordance with the method of claim 6.

10. The composition of claim 9 wherein the phosphorus to vanadium ratio is about 1.2.

11. The method for the preparation of an improved oxidation catalyst from a particulate complex mixed oxide dihydrate of vanadium and pentavalent phosphorus, said oxide having a phosphorus to vanadium atomic ratio in the range from about 1–2 to 1, and said vanadium having an average valence in the range from about 3.9 to 4.5, which comprises subjecting said oxide to a series of three treatments by:

1. maintaining said oxide in the first treatment at a temperature in the range from about 370° to 394°C. for a period sufficient for a weight loss based upon the oxide dihydrate of about 5 weight percent, said period being in the range from about 0.5 to 2 hours;

2. passing a molecular oxygen-containing gas over or through said oxide during said first treatment, said gas being selected from the group consisting of air and molecular oxygen in admixture with an inert gas;

3. raising the temperature of the oxide resulting from the first treatment to a temperature in the range from about 395°C. to 425°C. and maintaining said temperature in the second treatment for a period sufficient for an additional weight loss of about 5 percent by said oxide;

4. raising the temperature of the oxide resulting from the second treatment to a temperature in the range from about 450°C. to 500°C. and maintaining said temperature for a period in the range from about 4 to 26 hours; and 5. maintaining the average valence of the vanadium component of said oxide at a value in the range from about 4.1 to 4.5 during said second and third treatments by passing a gas containing a hydrocarbon component through or over said oxide, said gas being selected from the group consisting of air and molecular oxygen in admixture with an inert gas.

12. The method as in claim 11 wherein the temperature during said first treatment is about 385°C.; the temperature during said second treatment is about 410°C.; and the temperature during said third treatment is about 480°C.

13. A method for preparing a catalyst comprising a mixed vanadium-phosphorus oxide which comprises:

a. mixing and heating a vanadium oxide compound with a pentavalent phosphorus oxide compound in the presence of a liquid medium to obtain a slurry containing vanadium-phosphorus oxide hydrate.

b. removing liquid medium from the slurry to obtain the oxide hydrate.

c. heating the oxide hydrate in the presence of an oxygen-containing gas for about 0.5 to 2.0 hours and at a temperature between about 370° and 394°C. to remove water of hydration from the oxide hydrate and obtain a resulting oxide, and d. heating the resulting oxide at a temperature between about 395° and 600°C. and in the presence of flowing oxygen-containing gas.

14. A method in accordance with claim 13 wherein the step (d) heating is carried out at a temperature between 450° – 520°C.

15. A method in accordance with claim 14 wherein the valence of the vanadium is maintained between 4.1 and 4.5 during step (d).

* * * * *